United States Patent [19]

Kivari et al.

[11] Patent Number: 5,613,235
[45] Date of Patent: Mar. 18, 1997

[54] OPERATION OF A RADIOTELEPHONE IN A SYNCHRONOUS EXTENDED STANDBY MODE FOR CONSERVING BATTERY POWER

[75] Inventors: Raimo K. Kivari, Haukipudas; Veijo L. Kontas, Oulu, both of Finland

[73] Assignee: Nokia Mobile Phones Limited, Salo, Finland

[21] Appl. No.: 496,688

[22] Filed: Jun. 29, 1995

[51] Int. Cl.$^6$ ....................................................... H04B 1/16
[52] U.S. Cl. ........................... 455/343; 455/38.3; 455/76; 375/376; 331/14
[58] Field of Search ..................................... 455/343, 38.3, 455/69, 70, 75, 76, 165.1, 183.1, 260; 375/376, 373; 331/14, 18

[56] References Cited

U.S. PATENT DOCUMENTS

| | | | |
|---|---|---|---|
| 4,029,900 | 6/1977 | Addeo | 178/69.1 |
| 4,592,076 | 5/1986 | El-Banna | 375/108 |
| 4,631,496 | 12/1986 | Borras et al. | 455/343 |
| 4,673,892 | 6/1987 | Miyashita et al. | 455/343 |
| 4,777,655 | 10/1988 | Numata et al. | 455/343 |
| 4,893,094 | 1/1990 | Herold et al. | 455/343 |
| 5,140,698 | 8/1992 | Toko | 455/343 |
| 5,175,874 | 12/1992 | Auchter | 455/89 |
| 5,224,152 | 6/1993 | Harte | 379/59 |
| 5,475,877 | 12/1995 | Adachi | 455/343 |

*Primary Examiner*—Reinhard J. Eisenzopf
*Assistant Examiner*—Doris To
*Attorney, Agent, or Firm*—Perman & Green

[57] ABSTRACT

A method and system for operating a radiotelephone at reduced power provides for a deenergization of a receiver of the radiotelephone wherein the receiver, during periods of activation, receives a sequence of messages of a control channel, each message having a synchronization portion and a data portion which follows the synchronization portion. Included within the radiotelephone is signal processing circuitry synchronized by a synchronization portion of an individual one of the messages to permit a reading of data of the data portion of an individual one of the messages. A digital phase locked lop (DPLL) with phase adjustment capability enables operation of synchronization circuitry and the data reading circuitry. Electronic circuitry within the DPLL provides for inhibiting the phase adjustment function in response to the command of a controller of the radiotelephone subsequent to a reading of data and concurrently with a termination of power to the receiver. The phase adjustment function is enabled upon reactivation of the receiver and operation of the data reading circuitry for reading data of a subsequent message.

21 Claims, 8 Drawing Sheets

OPERATION OF A RADIOTELEPHONE IN A SYNCHRONOUS EXTENDED STANDBY MODE FOR CONSERVING BATTERY POWER

BACKGROUND OF THE INVENTION

This invention relates to power saving operation of a cellular telephone handling a control channel and, more particularly, to the use of a digital phase locked loop with inhibition of phase adjustment during receiver power-down intervals.

Radiotelephones and particularly cellular telephones may be operated in a standby mode for conservation of electric power, particularly power provided by a battery. During the standby mode, the radiotelelephone must continuously receive and monitor signaling data sent by a base station via a forward control channel (FOCC). The signaling data employs a signaling format as is described, for example, in AMPS (EIA 553), DAMPS, CDMA and TACS specifications, and with a prescribed signal frame structure.

Radiotelephones are operated often on battery power. In order to provide a lengthy interval of operation without replacement or recharging of the battery, it is advantageous to construct and operate the electric circuits of the radiotelephone in a manner which conserves the utilization of electric power. An important example of such power conservation is found in the receiving circuitry employed in the FOCC. Examples of such power conservation are found in the following U.S. patents, namely, L. J. Harte, U.S. Pat. No. 5,224,152, T. J. Auchter, U.S. Pat. No. 5,175,874, E. J. Addeo, U.S. Pat. No. 4,029,900, and M. A. S El-Banna, U.S. Pat. No. 4,592,076. With respect to the conservation methods disclosed in the foregoing patents, there is a common problem in that, each time the receiver is turned off, a new synchronization is to be achieved from the Bit Sync and Word Sync patterns preceding the next frame to be received. If bit errors appear in these patterns, synchronization is not achieved, and the next frame is lost. One may implement pattern detection which detects the pattern with one or more bit errors, but this would increase a possibility of finding the pattern in a data field or from noise with a consequent erroneous frame synchronization.

A typical situation wherein bit errors arrive in a received signal, specifically in the synchronization patterns, is the situation wherein a radiotelephone is moving among various objects which reflect the signal and introduce multipath propagation of the signal. This causes short-term fading (Rayleigh fading) wherein, during fade peaks the received signal is very weak. In the foregoing methods of power conservation, there is a loss in synchronism for received data each time that the receiver is turned off and, accordingly, such method of power conservation may be referred to as a non-synchronous mode (NSM). Due to the loss of synchronism, the synchronism has to be reestablished at the beginning of each signal frame by a detection of the synch patterns.

A further disadvantage to the NSM mode of power conservation is that the receiver must be turned on with a significant advance in time, well before the synch pattern appears so that the RF (radio frequency) parts of the radiotelephone circuitry have sufficient time to adjust to the channel, and wherein the baseband parts of the radiotelephone circuitry have sufficient time to settle. By way of example in the settling of the baseband part of the circuitry, the circuitry normally employs a digital phase locked loop (DPLL) for synchronization to the bits of the frame signal before a synch pattern can be detected.

As a result, optimum power saving is not achieved because the receiver circuitry must be energized well before the occurrence of the synch patterns.

Yet a third aspect to the foregoing problem may be understood with respect to the signal formatting wherein the FOCC signal has both an A portion and a B portion wherein coded words in each of the portions are repeated. The repeats of the words of the A portion (A1, A2, . . . A5) and the repeats of the word of the B portion (B1, B2 . . . B5) are interleaved. Therefore, if radiotelephone is to be responsive to the B portion of the FOCC, then it is necessary to view also the A portion, although not needed, with a resulting wastage of power. Similarly, it is apparent that during reception of the B portion of the FOCC channel, the receiver is turned off later than in the case of a radiotelephone programmed to respond to the A portion. This results in less power saving for the B portion than for the A portion of the FOCC.

In a fourth aspect of the foregoing problem, it is noted that the microcontroller of the radiotelephone performs certain operations for each received frame of the control signal. Thus, if the microcontroller is operating in a standby mode, it must be interrupted and activated to operate at least once for each received frame. The foregoing problems arise because of the nonsynchronous mode of operation of the energy conservation procedures and circuitry.

SUMMARY OF THE INVENTION

The foregoing problem is overcome and other advantages are provided by implementation of a method of operation and a mode of construction of radiotelephone circuitry wherein, in accordance with the invention, power conservation is obtained by maintaining bit synchronization even during power-down intervals of the receiver. This accomplishes a major object of the invention to increase the amount of power conserved by not wasting power for operation of receiver circuits during such intervals of time as has been required for regaining synchronization. No such time intervals for reacquisition of synchronization are required in a radiotelephone incorporating the invention because synchronization is maintained during the power-down intervals.

Typically, in the receiving circuitry of the base band signaling unit of a radiotelephone, bit synchronization is obtained by means of a DPLL responsive to a bit sync (or dotting) portion of the FOCC signal. The invention provides improved operation of the DPLL wherein synchronism is maintained even during power-down of the receiver by inhibiting any adjustment to the phase of the output signal of the DPLL. This ensures that the output signal of the DPLL remains essentially in synchronism, apart from an insubstantial drift, with the system clock of a cellular telephone system, even upon a deenergization of circuits connected to the DPLL. In particular, the synchronism is maintained during the interval of time wherein power to the receiver is turned off and the input signal to the DPLL is missing.

The RF parts of the circuitry include an antenna, a transmitter and a receiver which are interconnected by a duplexer. Upon restoration of the power to the receiver, the RF parts of the circuitry resume their respective functions, and the receiver is able to communicate data to the DPLL after a dying out of initial transients present upon application of power to the receiver. When data appears at the input to the DPLL, the inhibition of the DPLL phase adjustment is terminated, and normal operation of the DPLL is resumed including the phase adjustment. Since synchronism has been maintained throughout the power-off interval, apart from a relatively insignificant drift of the DPLL output phase, there is no need to initialize the phase outputted by the DPLL upon resumption of receiver power, nor is there any requirement to provide an extended period of time to initialize the phase of the DPLL output signal. The slight drift in the DPLL is corrected readily during the reception of one of the FOCC words such as the A1 or the A2 word. Since there is essentially no lost time in reacquisition of the phase by the DPLL, the receiver can be turned on at a latter point in time, than has been possible heretofore, for an additional saving of power. The greatest source of delay, upon resumption of power to the receiver, is the start-up transient response for the receiver. The duration of the transient response is sufficiently short such that the resumption of power to the receiver can be accomplished just before or during the synchronization patterns of the FOCC message if the A portion (channel A) is being received, and during the A1 portion (Channel A, repeat 1) if the B portion (channel B) is being received. Bit receiving starts directly from the first occurrence of the FOCC data word A1 or B1. Utilization of the bit sync and the word sync portions of the FOCC message by the baseband signal processing circuitry is required only during initial activation of the radiotelephone or, possibly, during a hand-off between two cellular-telephone regions, but is not required thereafter once correct synchronism has been achieved.

A further advantage of the invention is that, by avoiding the need for resynchronization, operation of the radiotelephone is not degraded by a possible appearance of bit errors in the sync patterns. In the absence of the invention, wherein resynchronization is required continually, such errors in the sync pattern may result in the loss of a frame of the FOCC message. Such bit errors can be caused by fast signal fading or by other radio frequency disturbances such as co-channel interference, or by disturbance from a nearby transmitter. The foregoing embodiment of the invention may be referred to as an extended standby synchronous mode. A feature of this embodiment of the invention is the fact that, in the case of a radiotelephone operative with the B portion of the FOCC message, the power-off interval for the receiver can be extended until just before the occurrence of the B1 word because there is no utilization of the A1 word by the baseband signal processing.

A variation in the foregoing synchronous mode may be employed wherein, instead of receiving the A1 or the B1 word of each FOCC message, the radiotelephone circuitry may read the word A5 of the previous message and the word A1 of the current message (or similarly the words B5 and B1 for a radiotelephone operative with the B words). With this variation of the extended standby synchronous mode, the activation command (interrupt) for the microcontroller occur within an interval of time which is twice as long as in the first synchronous mode. This produces a saving of power to the microcontroller because there is less wastage of power associated with the activation of the microcontroller.

In a both forms of the extended standby synchronous mode, the clock which drives the baseband signal processing circuitry and provides the numerous clock signals at the various clock frequencies may be constructed of two portions wherein, the first portion is a stable clock oscillator operative at a relatively high frequency and locked to a base station by an automatic frequency control signal. The second portion comprises a clock oscillator having less stability and operative at a lower frequency. The second relatively slow clock oscillator is employed continuously for outputting clock signals to the baseband signal processing circuitry, and is calibrated against the first relatively fast and stable clock oscillator with the aid of a circuit which senses error in the slow clock frequency. A counter of pulses of the slow clock oscillator divides down the slow clock frequency to output the desired clock pulses. A switch is operated, when necessary, to direct pulses from the fast clock oscillator to the counter, thereby to increase the counting rate and advance the time of occurrence of a clock pulse from the counter. This corrects the output clock frequency in the event that the slow clock oscillator slows down from a predesignated frequency. Since operation of the fast clock oscillator is required only occasionally for correction of a timing error, considerable power can be saved by disconnection of power to the fast clock oscillator and activating the fast clock oscillator only occasionally.

BRIEF DESCRIPTION OF THE DRAWING

The aforementioned aspects and other features of the invention are explained in the following description, taken in connection with the accompanying drawing figures wherein.

Identically labeled elements appearing in different ones of the figures refer to the same element in the different figures.

DETAILED DESCRIPTION

Figure 1:
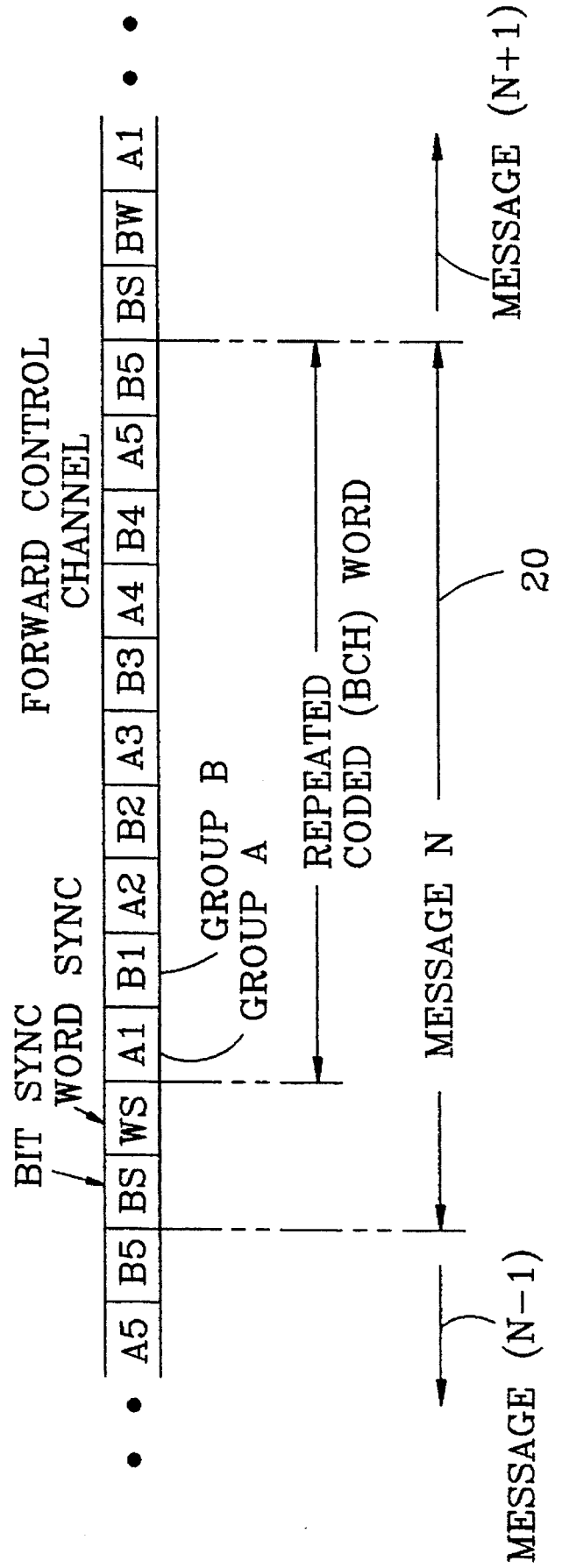
FIG. 1 is a diagram showing a succession of FOCC messages, including a frame of components of one complete message, which is employed both in the prior art and in the practice of the present invention.

FIG. 1 shows a frame 20 embodying a sequence of components of the $N^{th}$ message of a series of messages transmitted along the forward control channel from a base station (not shown) to a plurality of radiotelephones (not shown) of a cellular telephone communication system. Also shown in FIG. 1 is an end portion of the preceding message, the $(N-1)^{th}$ message, and a beginning of the following message, the $(N+1)^{th}$ message. In the frame 20, the first two components thereof are a bit sync (BS) portion and a word sync (WS) portion.

These are followed by the coded word appearing as part of group A or as a part of group B, with the words in each group being repeated and interleaved such that the first occurrence of the A word (A1) is followed by the first occurrence of the B word (B1) which, in turn, are followed by the second occurrence of the A word (A2) and the second occurrence of the B word (B2). The repetition of the A and the B words continue through a fifth occurrence, A5 and B5, of the respective words. The format of the message of the FOCC for a conventional AMPS signaling protocol is described in the EIA Interim Standard IS-3-B, "Cellular System Mobile Station —Land Station Compatibility Specification" (7/84), and in the Bell System Technical Journal, Vol. 58, No. 1, "Advanced Mobile Phone Service" (1/79). The AMPS signaling protocol is also specified for use in the EIA/TIA Interim Standard IS-54-B, "Cellular System Dual—Mode Mobile Station—Base Station Compatibility Standard (4/92). A TACS signaling protocol is similar to the AMPS, differing primarily in the bit rate (AMPS 10 k bit/s, TACS 8 k bit/s).

In the AMPS protocol, and for an FOCC, the signaling is a continuous bit stream from a base station (Land station) to a mobile station. The FOCC signaling message data frame is 463 bits long, and effectively contains one information word of 28 bits. The data frame contains two data streams represented by the words of group A and group B. Only one of these data streams is required for a particular telephone, and a selection between the two data streams is determined automatically by the internally stored number of the telephone. The 28 data bits of each word, such as the word A1 or B1, are encoded with a Bose-Chaudhuri-Hocquenghem (BCH) cyclic code that provides an encoded word of 40 bits (28 bits of data and 12 bits of parity). In the frame 20, the 40 bit string is repeated five times, as represented by the words A1–A5 and B1–B5, to provide redundancy against radio channel distortion, such as fades in amplitude and impulsive noise. The repetition of the coded word enables error correction and error detection. BCH decoding can correct typically a one bit error, and can also indicate if the decoded word is free of error. The BCH code has a Hamming distance of four and can thus detect up to four errors without the use of other error correction circuitry. The FOCC is employed for setting up a communication link from base station to mobile station, and includes the aforementioned bit sync and word sync portions to enable synchronization of the baseband signal processing circuitry of one telephone with the base station transmission so as to enable extraction of the data from the repeated word of either Group A or Group B. After the communication link is established, voice communication can proceed over a separate channel, namely, the voice channel, whereby a person at one telephone can communicate with a person at the other telephone.

There are other AMPS/TACS signaling protocols which are employed, namely, a reverse control channel (RECC) signaling protocol from mobile station to base station, the voice channels (FVC and RVC) signaling protocols, a voice channel signaling tone (ST), and voice channel supervisory audio tone (SAT) which are employed in cellular telephone systems but need not be discussed for purposes of describing the present invention.

Figure 2:
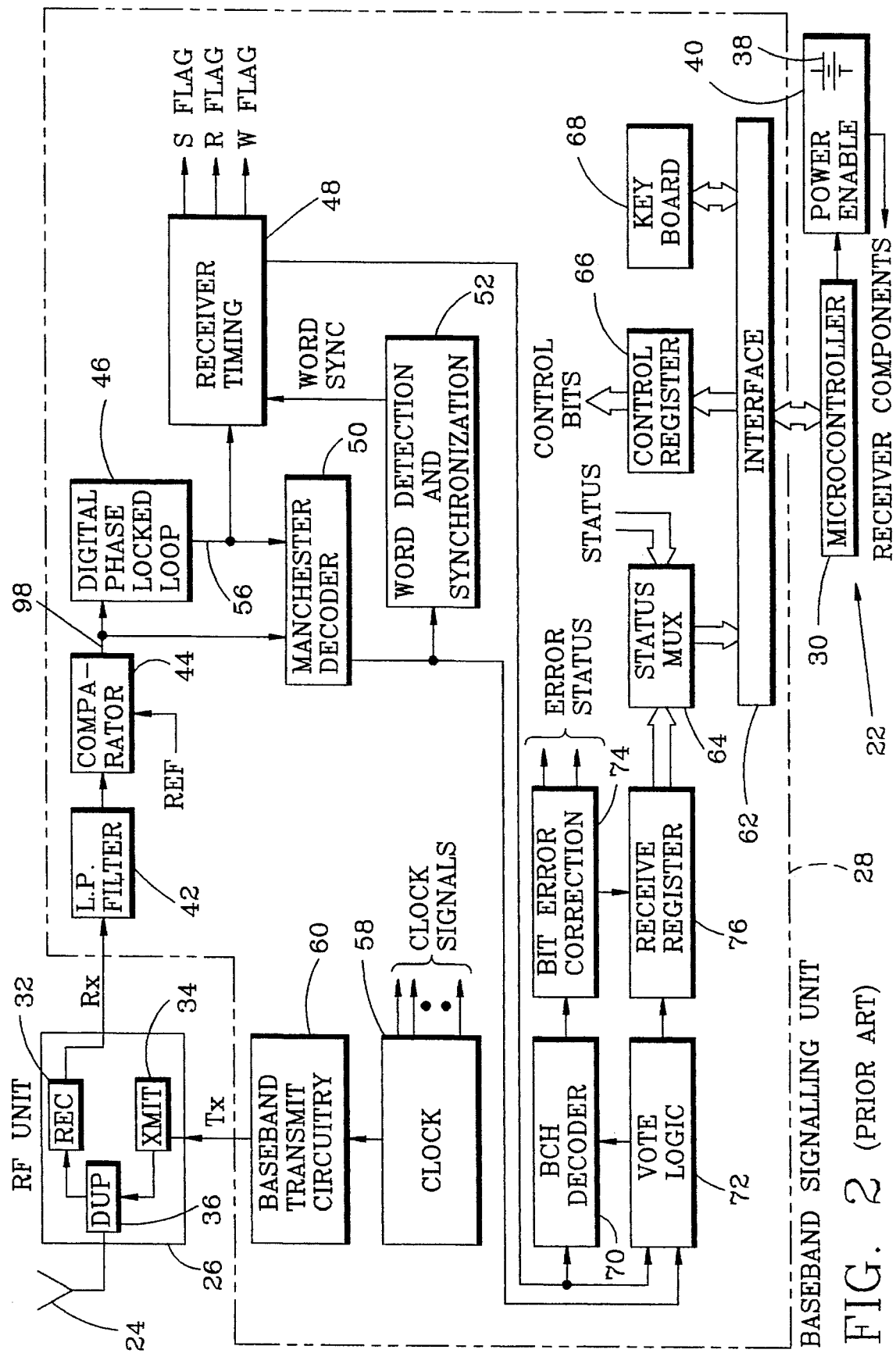
FIG. 2 is a block diagram of a baseband signaling unit including connection with a microcontroller and an RF unit of a radiotelephone in accordance with the prior art.

FIG. 2 shows circuitry employed typically in the portion of a conventional radiotelephone 22 (or cellular telephone) which is relevant to the practice of the invention. The radiotelephone 22 comprises an antenna 24, an RF unit 26 a baseband signaling unit (BBS) 28 such as a signal processing unit, and a microcontroller (MCU) 30 such as a computer connecting with the BBS 28 for controlling operation of the BBS 28. The RF unit 26 interconnects the antenna 24 with the BBS 28, and includes a receiver 32 and a transmitter 34 which are connected by a duplexer 36 to the antenna 24. The received signal Rx outputted by the receiver 32 in analog format is applied to the BBS 28 which converts the signal Rx to digital format by analog-to-digital converter (not shown). A signal TX to be transmitted is applied by the BBS 28 to the transmitter 34 in analog format, conversion from digital to analog format being provided by a suitable converter (not shown) in the BBS 28. Electric power for operation of the circuitry of FIG. 2 is provided by a battery 38 within a power enabling circuit 40 which is operative to apply electric power to various components of the circuitry employed in the receiving of the signal Rx. The power enabling circuit 40 is activated under command of the microcontroller 30. The signal Rx outputted by the receiver 32 has the format shown in FIG. 1.

As shown in FIG. 2, the BBS 28 includes a low pass filter 42, a comparator 44, a digital phase locked loop (DPLL) 46, a receiver timing unit 48, a Manchester decoder 50, and a unit 52 for word detection and synchronization. In operation, the received signal (Rx) is filtered by the filter 42 and applied via the comparator 44 to input terminals of the DPLL 46 and the decoder 50. The comparator 44 compares the amplitude of the received signal to a reference 54 to insure that the signals applied to the DPLL 46 and the decoder 50 are above the noise level. The DPLL 46 is responsive to the bit sync portion of the FOCC message (FIG. 1) to output a reference signal on line 56 which is in synchronism with the bit sync portion of the FOCC message. The reference signal on line 56 is employed by the receiver timing unit 48 in providing output command signals, and by the decoder 50 which decodes the Manchester encoded data to an NRZ (non return to zero) format.

The receiver timing unit 48 outputs three flag signals indicated as the SFLAG, the RFLAG, and the WFLAG. The receiver timing unit 48 extracts data from received frames of the FOCC, and generates data transfer interrupts, represented by the WFLAG, for the microcontroller 30. The timing unit 48 also separates the time-multiplex data streams A and B as well as busy/idle information of the FOCC. The timing unit 48 maintains bit and word synchronization during different frames, and outputs the synchronization status as the SFLAG. The repeat flag (RFLAG) is used to indicate the end of each received repeat of a data word of the A group or the B group of FIG. 1. The word detection and synchronization unit 52 is responsive to the word sync portion of the message of FIG. 1 for synchronizing operation of the BBS 28 with the word sync portion of the message, thereby to ensure accurate reception of data within the data word of either group A or group B. Also included in the circuitry of FIG. 2 is a clock 58 which applies clock signals for operation of various ones of the components of the BBS 28, such as the DPLL 46 by way of example, and is utilized also for applying a clock signal to baseband transmit circuitry 60 of the BBS 28 which provides the transmit signal Tx to the transmitter 34.

The BBS 28 further comprises an interface unit 62, a status multiplexer 64, a control register 66, and a keyboard 68. The interface unit 62 provides for communication of digital signals between the BBS 28 and the microcontroller 30, the digital signals including operational status such as the data provided by the flag signals outputted by the receiver timing unit 48, and applied via the status multiplexer 64 to the interface unit 62. The digital signals include control signals from the microcontroller 30 which are placed in the control register 66 for outputting control bits for operation of various ones of the components of the BBS 28. Also, signals entered by a person operating the radiotelephone, the entry being via the keyboard 68, are applied via the interface unit 62 to various components of the radiotelephone for accomplishing various communication functions as is well known.

The BBS 28 further comprises a BCH decoder 70, a logic unit 72, an error corrector 74, and a receive register 76. In operation, the logic unit 72 is responsive to timing signals of the timing unit 48 for observing the data words outputted by the decoder 50. The word detection and synchronization unit 52 applies a word sync signal to the timing unit 48 which enables the timing unit 48 to designate to the logic unit 72 the time frame for reception of each of the data words of group A or group B of the FOCC message (FIG. 1). The logic unit 72 is operative to compare the successive occurrences of the data word to check for agreement among detected ones of the words and, in essence, to vote for the most frequent occurrence of the word in the event that there is a disparity among repetitions of the data word. The data word selected by the logic unit 72 as being the correct representation of the data word is applied to the BCH decoder 70 which operates also in response to timing signals outputted by the timing unit 48.

Figure 3:
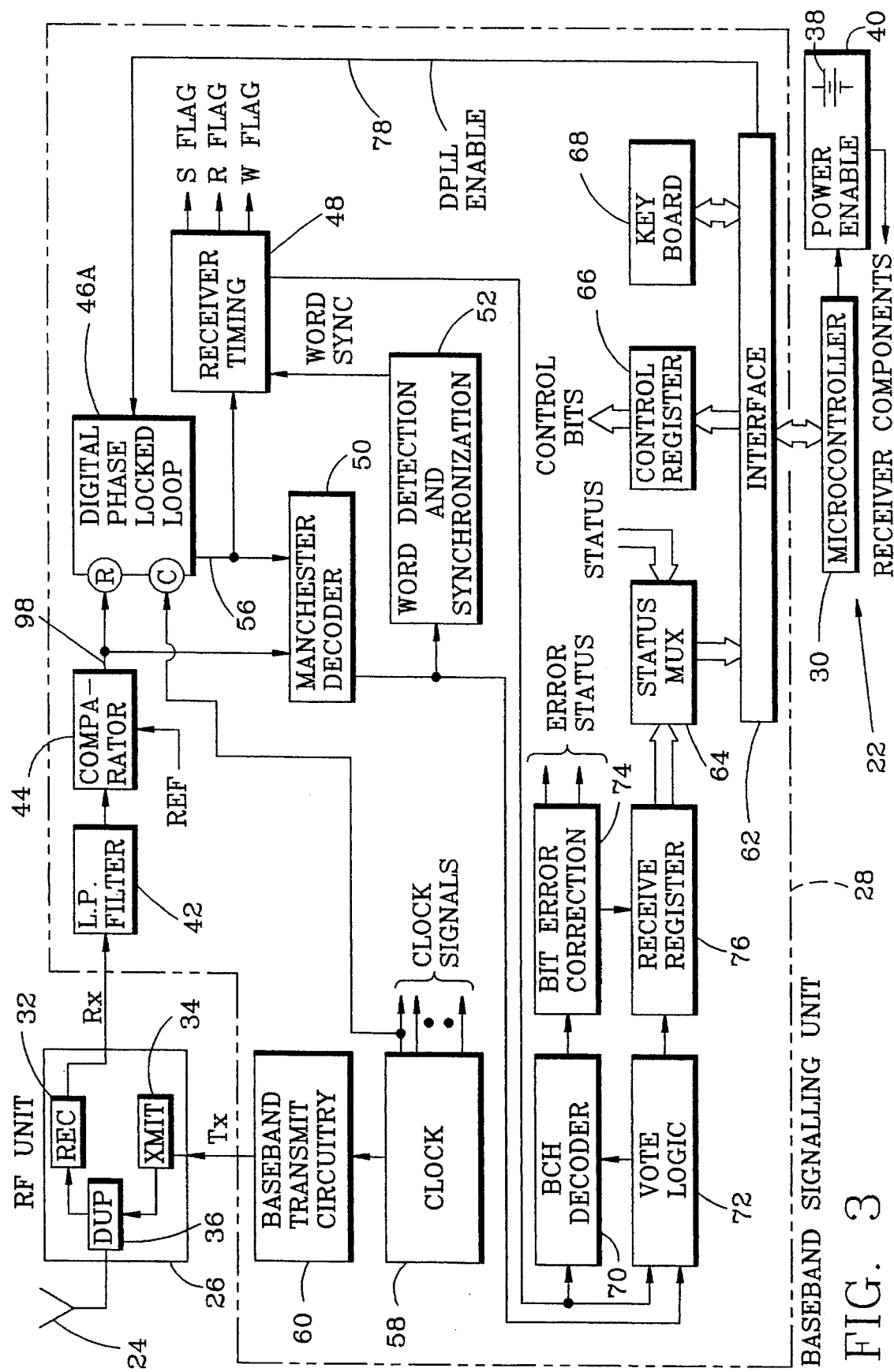
FIG. 3 is a block diagram showing the same circuitry as does FIG. 2, but including a modified DPLL with an enable line for operating the DPLL in accordance with the invention.

The decoder 70 decodes the BCH encoded data words to extract data from the data word. The data, in digital format, is applied by the decoder 70 to the correction unit 74 for correction of bit errors therein, and outputs the corrected data to the receive register 76. The logic unit 72 strobes the register 76 for receiving the corrected data. The corrected data is outputted from the register 76 to the multiplexer 64 for communication via the interface 62 to the microcontroller 30. The presence of any erroneous bits detected by the correction unit 74 is outputted as an error status from the correction unit 74, and may be employed by the microcontroller 30 to determine whether viewing of a further frame of the FOCC message should be undertaken. The invention is shown in FIG. 3 which includes all of the circuitry of FIG. 2 except for the replacement of the DPLL 46 with a DPLL 46A incorporating circuitry of the invention, and also a DPLL enable line 78 extending from the interface unit 62 to the DPLL 46A. As will be explained with reference to FIG. 4, the novel DPLL 46A includes both a source of output frequency and a source of adjustable phase shift, the latter being activated or inhibited in accordance with a command of the enable line 78. The invention calls for an inhibiting of phase adjustment by the DPLL 46A, and a freezing of its phase shift, at such times when the microcontroller 30 has directed a termination of power to components of the receiver 32 as well as, if desired, components of the BBS 28. By inhibiting phase changes at the DPLL 46A in the absence of an input signal to the DPLL 46A, such absence of input signal occurring upon a deenergization of the receiver 32, the DPLL 46A is able to maintain synchronism with a clock of the base station of the cellular telephone system. There is no more than an insignificant amount of phase drift during intervals of inhibition of phase adjustment of the DPLL 46A.

Figure 4:
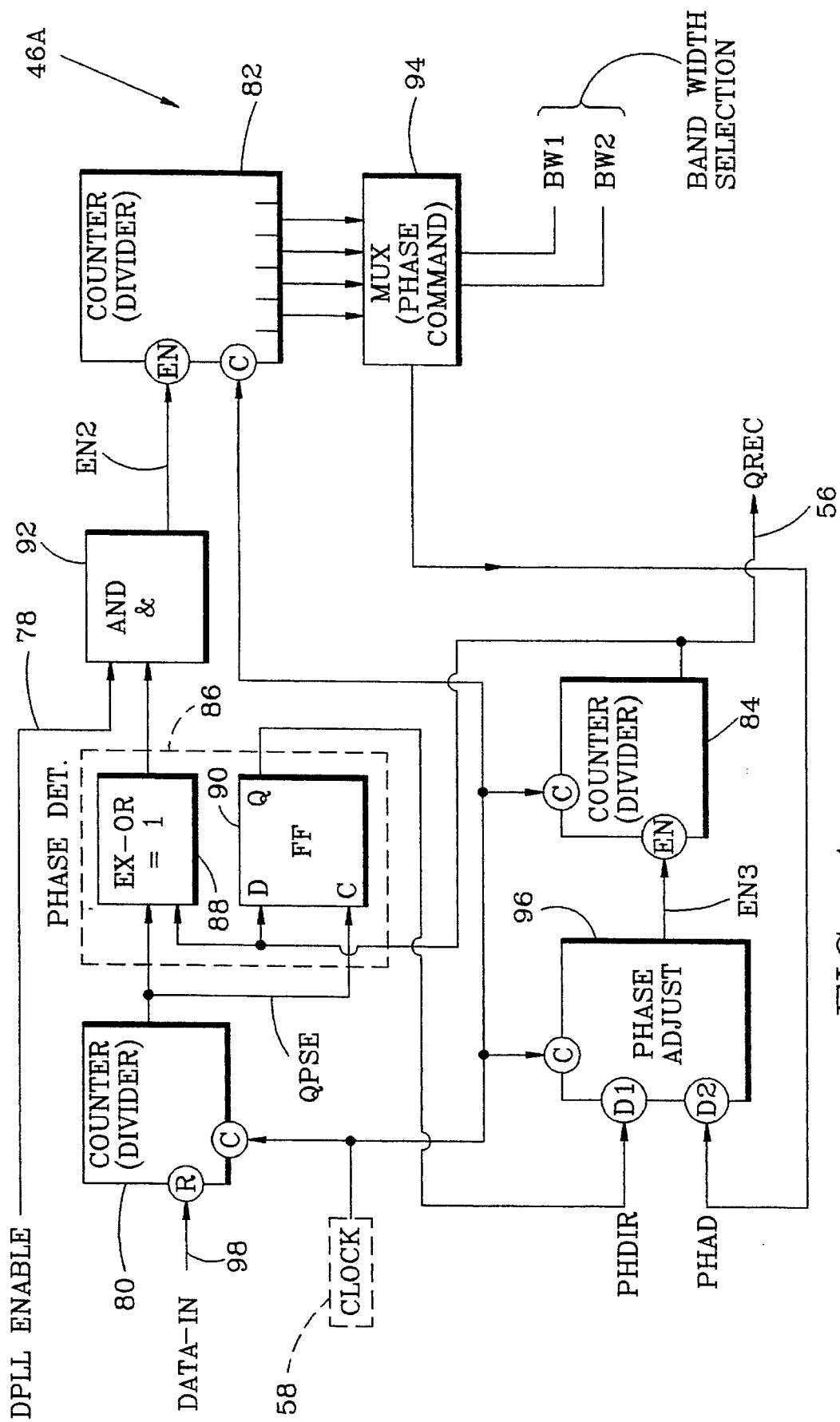
FIG. 4 is a block diagram showing construction of the DPLL employed in the practice of the present invention.

FIG. 4 shows construction of the DPLL 46A in accordance with the invention. The DPLL 46A comprises three counters 80, 82, and 84 which serve as frequency dividers, a phase detector 86 comprising an exclusive-OR (EX-OR) gate 88 and a flip-flop 90, an AND gate 92, a multiplexer 94, and a phase adjustment circuit 96. In operation, the three counters 80, 82, and 84 count clock pulses provided by the clock 58 of FIG. 2, the clock pulses being applied to a terminal C of each of the counters 80, 82, and 84. The counter 80 receives a data input on line 98 from the comparator 44 of FIG. 2. A positive transition in the data on line 98 from a logic state of 0 to a logic state of 1 serves to reset the count of the counter 80, and thereby maintain synchronism between an output signal of the counter 80 and the input data from line 98. The reset function is indicated by the terminal R to which the data is applied.

An output signal QPSE of the counter 80 is applied to an input terminal of the EX-OR gate 88 and a clock input terminal of the flip-flop 90. A data (D) input terminal of the flip-flop 90 and a second input terminal of the EX-OR gate 88 receive the output signal QREC of the DPLL 46A on line 56. An output signal of the EX-OR gate 88 is applied by the AND gate 92 to an enable (EN) terminal of the counter 82. The counter 82 provides output signals at differing frequencies, one of the output signals being selected by the multiplexer 94 and being identified as the signal PHAD. The output signal of the flip-flop 90 is identified as PHDIR. The phase adjustment circuit 96 has two data input terminals, D1 and D2, and outputs a signal EN3 upon a clocking of the phase adjustment circuit 96 by the clock 58 under the condition wherein a presence of signals at both of the input terminals provide an output logic state of 1. The output signal PHDIR of the flip-flop 90 is applied to the first input terminal of the phase adjustment circuit 96, and the output signal PHAD of the multiplexer 94 is applied to the second input terminal of the phase adjustment circuit 96. The output signal EN3 of the phase adjustment circuit 96 enables the counter 84 to provide an output square wave signal at the desired frequency and phase, this signal appearing on line 56 and serving as the output signal QREC of the DPLL 46A. The DPLL enable signal on line 78 is applied to a second input terminal of the AND gate 92 to enable passage of the output signal of the EX-OR gate 88 to the enable input terminal of the counter 82. The output signal of the AND gate 92 is identified as EN2.

In operation, the counter 80 serves to divide the input clock, typically a frequency of 1.08 megahertz (MHz), to the bit rate clock QPSE (10 KHz). The frequency of the QPSE signal is the same as that of the output frequency of the output signal QREC of the DPLL 46A. In the phase detector 86, the EX-OR gate 86 provides for phase direction control for the phase adjustment of the output signal QREC. The output signal of the EX-OR gate 88 is responsive to a phase difference between the QPSE signal and the QREC signal. The PHDIR signal outputted by the flip-flop 90 indicates whether the phase of the QREC signal is leading or lagging the QPSE signal. The output signal PHAD selected by the multiplexer 94 determines the speed of the phase adjustment and, therefore, the bandwidth of the DPLL 46A. The multiplexer 94 is responsive to input signals BW1 and BW2 for selection of bandwidth, the signals being applied by the microcontroller 30 (FIG. 3) via the control register 66. The phase adjustment circuit 96 is operative in the phase adjustment process for controlling the phase of the output signal QREC by enabling the counter 84. The counter 84 divides the clock signal of the clock 58 by a factor of 54 in a preferred embodiment of the invention. Alternatively, if the counter 84 is enabled by every second input clock by the enable signal EN3, the counter 84 provides for a frequency division by a factor of 108 to provide an output frequency equal to that of the QPSE signal.

Each falling edge of the PHAD signal causes phase adjustment in the following manner. If the QREC signal is leading the QPSE signal, as detected by the flip-flop 90 and indicated by the PHDIR signal, the counter 84 is disabled for two successive clock periods. This delays the next output clock edge of the QREC signal by one clock period. Similarly, if the QREC signal is lagging, the counter is enabled for two successive clock periods, this causing the next output clock edge of the QREC signal to appear earlier. With respect to the operation of the AND gate 92, if the DPLL enable signal on line 78 is set to a logic 1, the AND gate 92 is transparent to the signal outputted by the exclusive-OR gate 88. However, if the DPLL enable signal is set to a logic-0, the counter 82 is disabled, and there are no transitions occurring in the PHAD signal outputted by the multiplexer 94. Consequently, the phase adjustment circuit 96 remains in its nominal state, enabling the counter 84 by every second clock. The PHDIR signal does not introduce changes to the EN3 signal outputted by the phase adjustment circuit 96 upon the absence of transitions in the PHAD signal. Thus, the phase is frozen.

By way of alternative embodiments in the construction of the DPLL 46A, the inhibiting of the phase adjustment can be accomplished by clamping the data input to terminal R of the counter 80 to either a low or a high level, as by means of an OR gate (not shown) during receiver off periods. In this way, during clamping, the input data remains stable and, since there are no transitions in the input data at the terminal R, the counter 80 is not reset, and continues to operate at its nominal frequency.

Still another preferred means for inhibiting the phase adjustment is to stop the input clock 58 to the DPLL during receiver off periods. This also reduce the power consumption to the DPLL. During these periods, accurate timing would have to be maintained by other means, because the DPLL output clock would not be running.

Figure 5:
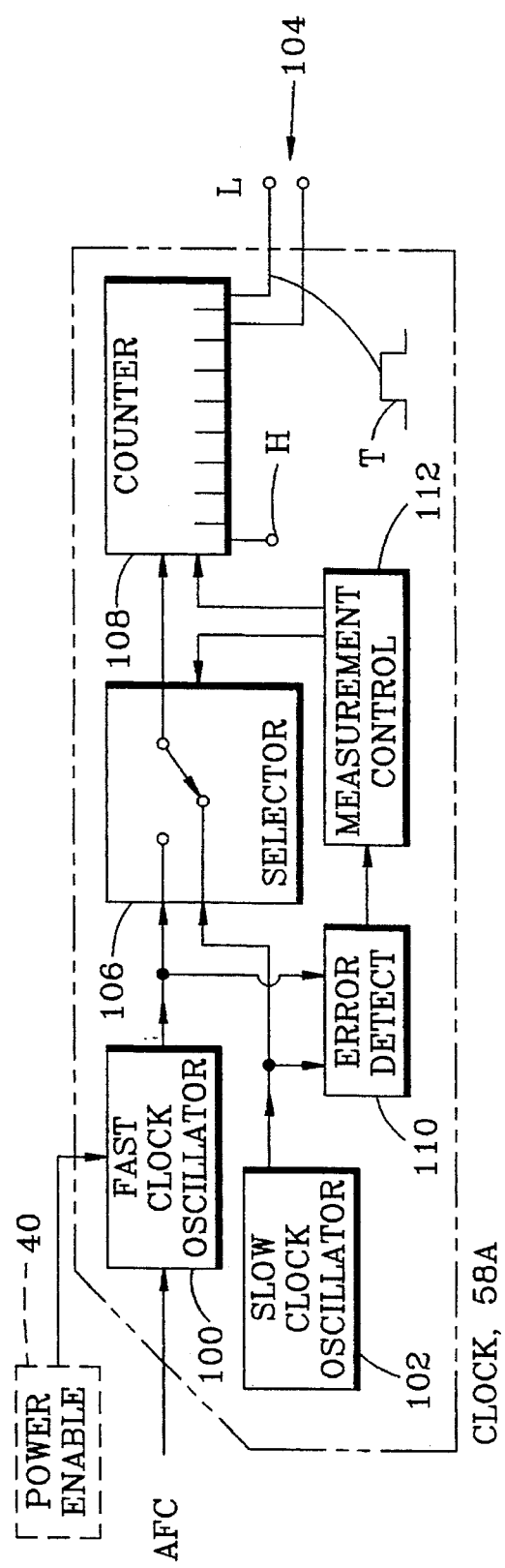
FIG. 5 is a block diagram of an alternative configuration of a clock which is a composite of a lower frequency clock oscillator which is continuously energized with electric power, and a second relatively high frequency clock oscillator of greater accuracy, wherein the higher frequency clock oscillator is energized on a part-time basis for calibration of the lower frequency clock oscillator.

FIG. 5 shows details in the construction of a clock 58A which may be substituted for the clock 58 (FIG. 3), the clock 58A providing the feature of increased saving of power in accordance with a feature of the invention. The clock 58A may be referred to as a sleep clock. The clock 58A comprises a fast clock oscillator 100 synchronized to the base station (not shown) by an automatic frequency control (AFC) signal, and a slow clock oscillator 102. The terms fast and slow indicate the relative frequencies of operation of the clock oscillators 100 and 102. The fast clock oscillator 100 operates with greater precision and accuracy than does the slow clock oscillator 102. However, the fast clock oscillator 100 suffers from a disadvantage in the consumption of substantially more power than does the slow clock oscillator 102. The clock 58A is operative to conserve power by employing the slow clock oscillator 102 to provide output clock signals on lines 104, and to maintain the desired accuracy by occasional use of the fast clock oscillator 100 to compensate for any drift in the output clock signal T resulting from a drift in the slow clock oscillator 102.

The clock 58A further comprises a selector switch 106, a counter 108, an error detector 110, and a measurement controller 112. The switch 106 is operative, under control of the controller 112, to select the output clock signal from either the fast clock oscillator 100 or the slow clock oscillator 102 for application to the clock input terminal of the counter 108. The counter 108 counts the clock pulses of the clock signal selected by the switch 106, and provides at its various counter stages square wave signals at pulse repetition frequencies varying from a lowest frequency (L) to a highest frequency (H). Each counter stage operates at half the frequency of the preceding stage. The lowest frequency stage, and possibly one or more higher frequency stages provide output signals of the clock 58A. Thus, the output clock signal T has a duration equal to the duration of many clock pulses of the slow clock oscillator 102.

The slow clock frequency of the slow oscillator 102 is set at designated value such that the fast clock frequency of the fast clock 100 is a multiple of the slow clock frequency. The error detector 110 detects a deviation in the slow clock frequency from its designated value by using the high clock frequency as a standard against which the slow clock frequency is measured. Since the slow oscillator 102 is operating continuously while the fast oscillator 100 is activated only occasionally by the power enabling circuit 40, detection of frequency error for calibration of the slow oscillator 102 can be accomplished only during those intervals of time when the fast oscillator 100 is operating. The measurement controller 112 is responsive to the error signal outputted by the error detector 110. If the slow clock is operating at a frequency greater than the designated value, the measurement controller 112 momentarily commands the counter 108 to stop counting, and thereby retards the occurrence of the outputted timing signals T. If the slow clock is operating at a frequency lower than the designated value, the measurement controller 112 momentarily commands the switch 106 to select the clock pulses from the fast oscillator 100 for counting by the counter 108, and thereby advances the occurrence of the outputted timing signals T.

Figure 6:
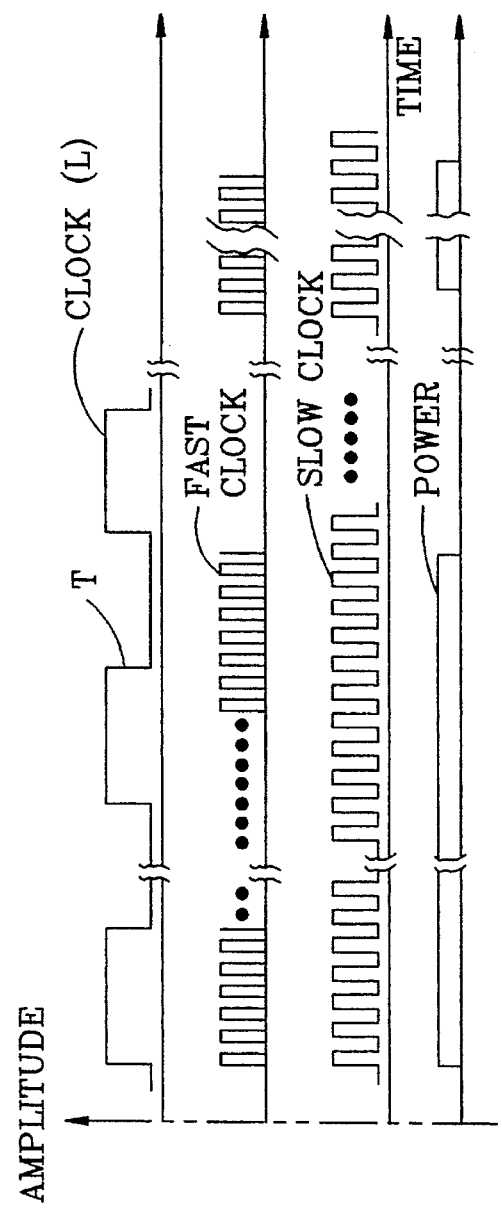
FIG. 6 is a timing diagram useful for explaining operation of the composite clock of FIG. 5.

The graphs of FIG. 6 demonstrate operation of the clock 58A of FIG. 5. The first graph depicts the low frequency output signal (L) which is provided by dividing down the output frequency of the slow clock oscillator 102 by the counter 108. The second graph depicts the clock pulse signal outputted by the fast clock oscillator 100, this being present during the presence of power from the power enabling circuit 40, and terminating upon a termination of this power. The fourth graph depicts the times of application of power by the power enabling circuit 40 to the fast clock oscillator 100. The third graph depicts the clock pulse signal outputted by the slow clock oscillator 102. As may be seen by inspection of the second and the third graphs, the duration of a slow clock pulse is longer than the duration of a fast clock pulse. Further, as may be seen by inspection of the first and the third graphs, the duration of a pulse of the output clock signal is much longer than the duration of a pulse of the slow clock signal. These graphs also demonstrate operation of the selector switch 106 wherein, by switching from pulses of the slow clock oscillator (third graph) to pulses of the fast clock oscillator (second graph), the counter 108 is made to count faster, this resulting in advancement in the time of occurrence of a timing pulse T.

Figure 7:
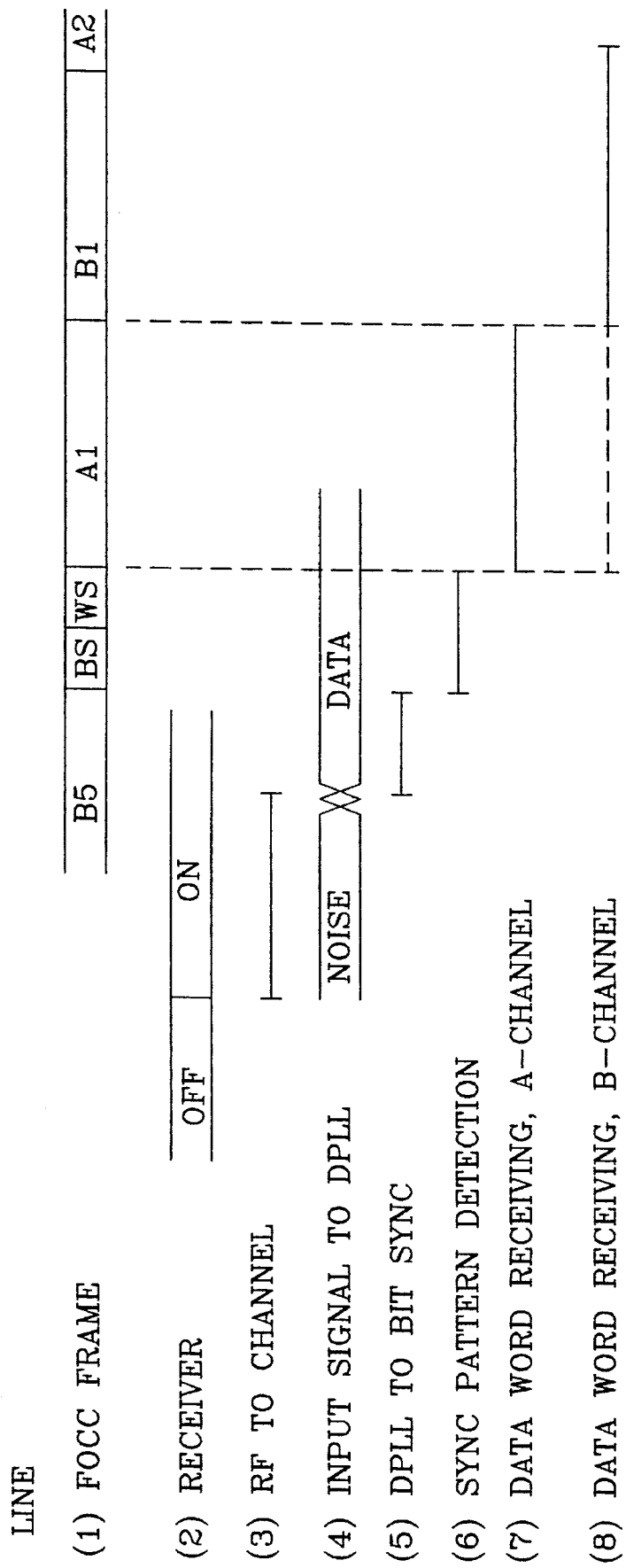
FIG. 7 is a timing diagram useful in explaining operation of the circuitry of FIG. 2 in accordance with the prior art.
Figure 8:
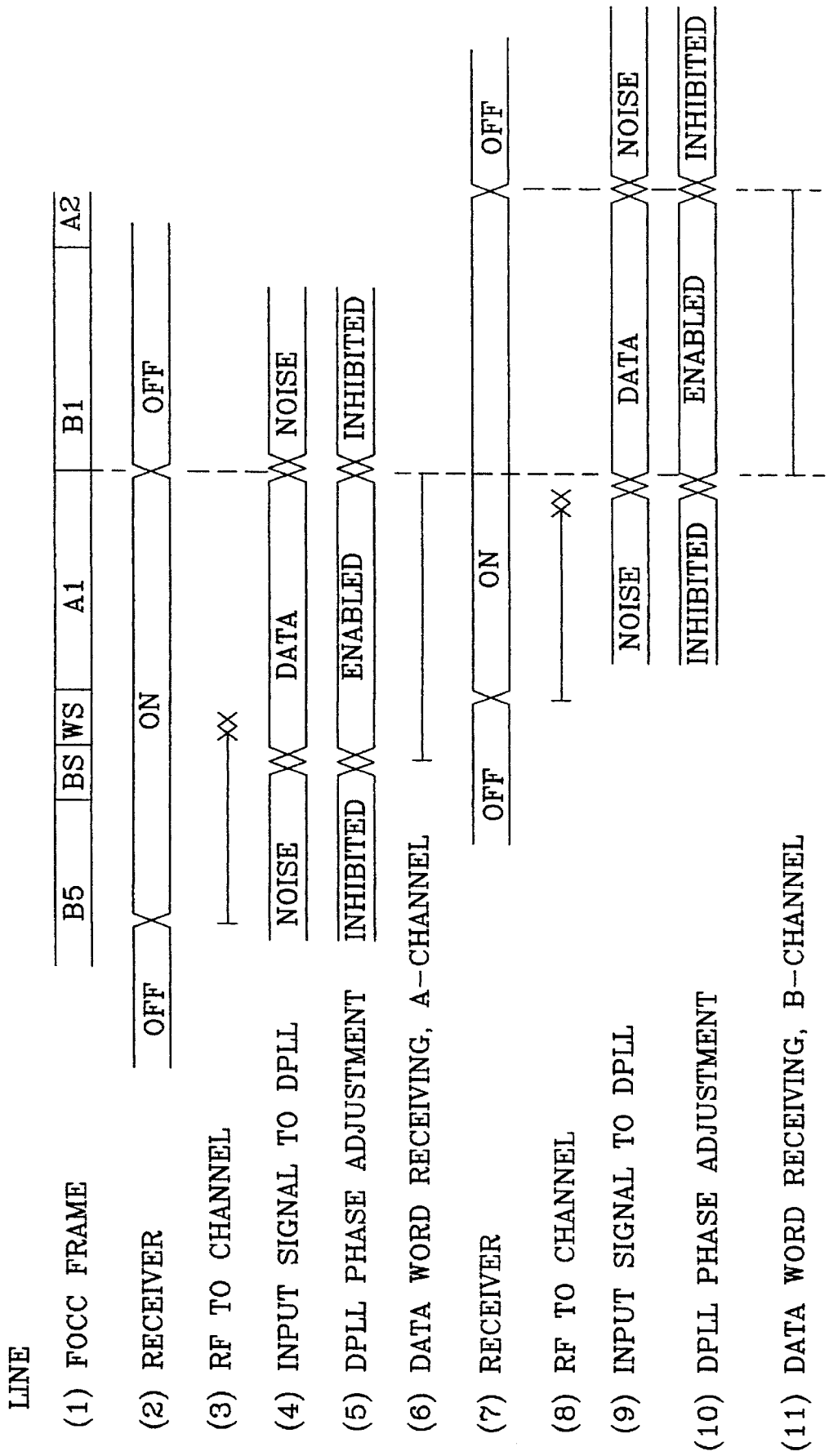
FIGS. 8 and 9 are timing diagrams useful in explaining operation of the circuitry of the invention.
Figure 9:
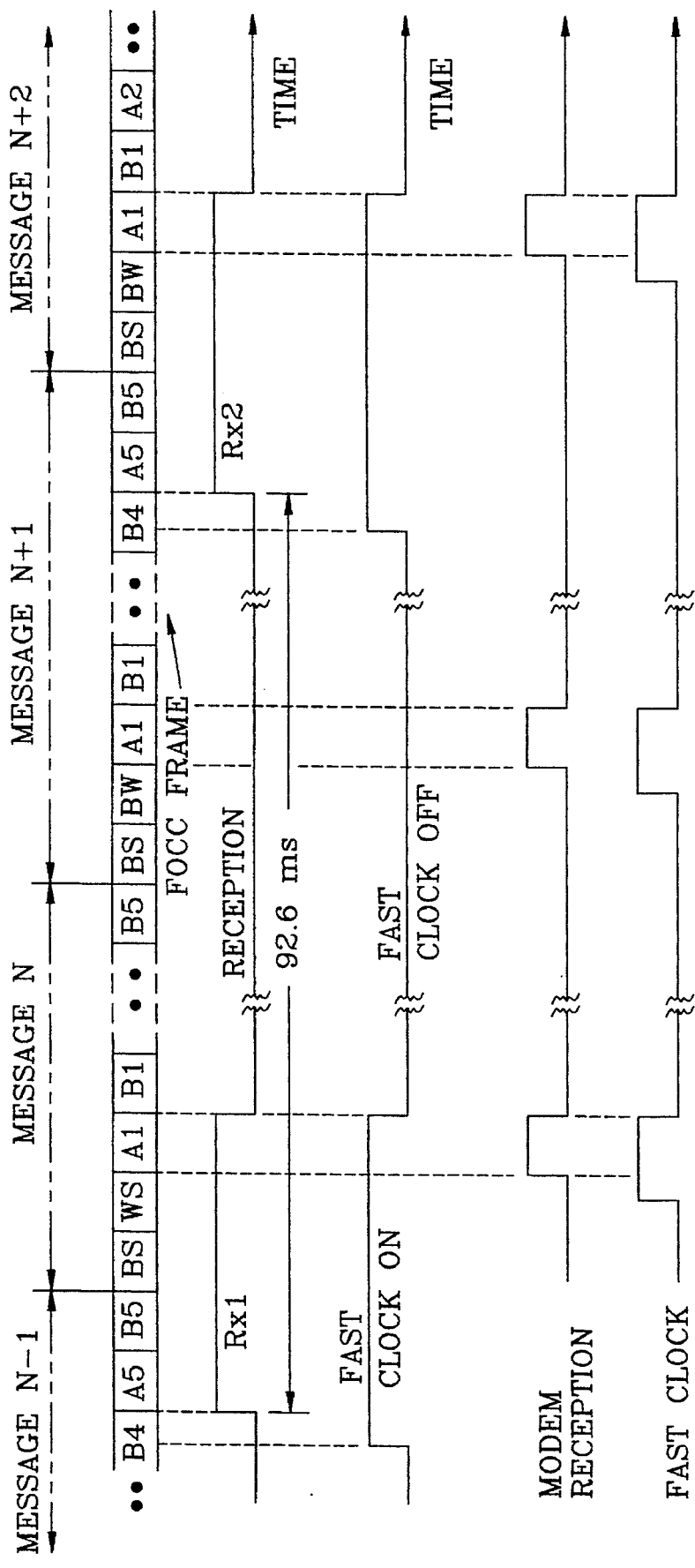

The timing diagrams of FIGS. 7–9 are useful for comparing the features of the invention to the prior art. FIG. 7 shows operation of the circuitry of FIG. 2 in accordance with the prior art, while FIGS. 8–9 show features of the invention. In FIG. 7, the first line of the timing diagram s a portion of the message frame 20 of FIG. 1. The second line of the timing diagram shows conservation of power applied to the receiver wherein power turn-on is applied well before occurrence of the bit sync, and possibly before occurrence of the B5 word. As shown in the third line, the RF signal appears upon activation of the receiver, this introducing initially noise (the fourth line) to the DPLL which, after the initial settling transients die out in the receiver, changes to a data signal at the input terminal of the DPLL. There is a short delay between reception of the data to the DPLL (line 5) and the inception of the bit sync. Line 6 shows the interval of time during which bit and word synchronization take place. Line 7 shows the interval of time during which reception of a data word occurs for a telephone operative with the A portion of the FOCC channel, and line 8 shows the interval of time during which a data word is being received for a telephone operative with the B portion of the FOCC channel.

The timing diagram of FIG. 8 shows information which, in part, is similar to that of FIG. 7 and, in part, differs from FIG. 7 in view of the features and advantages of the invention. The first line of the timing diagram shows a portion of the FOCC message frame 20 of FIG. 1. The second line of the timing diagram shows conservation of power by turning the receiver on and off. The period of time during which the receiver is energized is shown for the case of reception of the A1 word in a telephone operative to respond to the A portion of the FOCC message. The receiver is energized prior to the A1 word. Energization of the receiver continues until the end of the A1 word. During the initial transient in the receiver occurring upon energization (third line), RF energy appears with the application of noise (fourth line) at the input terminal of the DPLL. As the settling transient of the receiver dies out, the input signal to the DPLL contains data of the A1 word. Upon the conclusion of the A1 word, wherein the receiver is turned off, noise returns to the input terminal of the DPLL. The fifth line shows the inhibiting and the enabling of the phase adjustment of the DPLL. The DPLL is inhibited both before the A1 word and after the A1 word, but is enabled during the reading of the A1 word. This enables reception of the A1 word (sixth line) at the time of occurrence of the A1 word. The inhibiting of the phase adjustment of the DPLL is needed before and/or after an occurrence of the A1 word in order to keep the DPLL output clock signal (line 56 in FIG. 3) in correct phase for the next message (A1 or B1). If not inhibited, the DPLL phase adjustment would follow the noise signal during receiver off periods. Correct timing between consecutive messages (during receiver off periods) can be maintained by DPLL output clock (signal on line 56) if the DPLL input clock is present, or by a timer using the clock 58A of FIGS. 3 and 5.

The seventh line of the timing diagram of FIG. 8 shows the energization of the receiver in the situation wherein the radiotelephone is to respond to the words of the B group of the FOCC message. The receiver is energized prior to the inception of the B1 word, typically during the occurrence of the A1 word. The receiver is deenergized at the conclusion of the B1 word. The eighth line shows that the RF signal appears upon energization of the receiver, this resulting initially in the presentation of noise (ninth line) to the input terminal of the DPLL. After the initial transient settles in the receiver, the noise changes to data at the input terminal of the DPLL. A transition from noise to data occurs at or slightly before the inception of the B1 word. At the conclusion of the B1 word, wherein the receiver is deenergized, the noise again appears at the input terminal of the DPLL. The tenth line shows that the phase adjustment of the DPLL is inhibited except during the period of the B1 word, during which period the DPLL phase adjustment is enabled. This permits reception of the B1 word (line 11) at the time of occurrence of the B1 word.

Comparison of the graphs of FIG. 7 and 8 show that, in the case of the invention as depicted in FIG. 8, the receiver is energized for a shorter period of time than occurs in the prior art of FIG. 7 for a significant saving of power. The reduced energization interval of the receiver is brought about by use of the inhibiting of phase adjustment of the DPLL. Furthermore, it is noted that, in the case of a radiotelephone operative only for A-group words or for B-group words, the receiver need be energized only during an interval of time encompassing the particular word plus a short period of time preceding the word, in accordance with the invention. In contrast, in the prior art, a reading of the B word requires that the receiver be on throughout the duration of the A word as well as the synchronization intervals which precedes the A word. Thus, there is a significant saving of receiver power by operation of the invention.

The timing diagram of FIG. 9 shows operation of the power enabling circuitry 40 (FIG. 3) by the microcontroller 30 for the alternative mode of synchronization wherein the receiver is activated only during alternate occurrences of the bit and word sync portions of the FOCC message. This is demonstrated in FIG. 9, by way of example, for a radiotelephone operative for reading the words of the A portion of the FOCC message. The first line of the timing diagram shows a succession of FOCC messages including two complete messages, a portion of the end of the preceding message, and a portion at the beginning of the succeeding message. Also, the sleep clock 58A (FIG. 5) can be used with this alternative mode of operation, as shown in FIG. 9. Line 2 shows the periods for receiving A-group words, but the receiver must be activated earlier. Line 3 shows earlier energization of the receiver and change from slow clock oscillator to fast clock oscillator during operation of the sleep clock 58A.

The second line shows the intervals of time during which the receiver is activated. The receiver is activated during the A5 and the B5 words of the $(N-1)^{th}$ message, the activation continuing through the bit sync and the word sync and the A1 word of the $N^{th}$ message, at which point the receiver is deenergized. The receiver remains deenergized until the appearance of the A5 word of the $(N+1)^{th}$ message, and remains energized until the end of the A1 word of the $(N+2)^{th}$ message. The length of a period of the timing waveform of the energization of the receiver, as shown in the second line, is equal to 92.6 milliseconds (ms), this being double the duration of one of the messages. The third line shows, by way of example, the corresponding time during which the composite clock 58A of FIG. 5 would be energized, the energization beginning somewhat before the energization of the receiver (line 2) and terminating with the deenergization of the receiver. The waveform depicted in the third line of FIG. 9 corresponds to the waveform depicted in the second line of FIG. 6.

This is compared with use of the sleep clock 58A in the first mode of operation indicated in the fourth and the fifth lines of the diagram. In the first mode of operation, modem reception is activated during the A1 portion of each word. The DPLL 46 (FIG. 3) need not be synchronized with a synchronization bit, but can achieve bit synchronization from either synchronization bits or data bits. The receiver timing unit 48 (FIG. 3), which is driven by the output clock signal on line 56 from the DPLL, detects the word sync pattern and maintains frame sync in normal receiving mode before changing to extended standby mode. The occasions of operation of the fast clock oscillator 100 (FIG. 5) correspond to the A1 portions of each word, with activation of the fast clock oscillator 100 beginning prior to the A1 portion. Comparison of the alternative mode in lines 2 and 3 with the first mode in lines 4 and 5 of the diagram shows that the alternative mode has the advantage of reading two repeats A5 and A1 (or B5 and B1) of two consecutive words including the synchronization data of the BS and the WS fields, this providing for only half the number of wake-up procedures for the fast oscillator 100 of the sleep clock 100 as occurs with the first mode of operation. Thus, in the alternative mode of operation, there is a consequent reduction in power wastage during wake-ups. With respect to use of the sleep clock 58A (FIG. 5) in either of the modes of operation, it is noted that the fast oscillator 100 is energized and is employed for generation of the output clock pulses during such times as the DPLL 46 (FIG. 4) is operative to accomplish a phase adjustment. Thereby, the invention provides for operation of the circuitry of the radiotelephone with improved conservation of power.

It should be realized that, because resynchronization is not required, the phase adjustment can be enabled at any point in time during the data portion of a message. This is the case whether there is one channel or multiple channels. Furthermore, it should be realized that the phase adjustment could be enabled during the synchronizing portion, although this may not be desirable for many applications.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A method for operating a radiotelephone at reduced power, the radiotelephone having a receiver for receiving a sequence of messages of a control channel, each message having a synchronization portion and a data portion which follows the synchronization portion, the radiotelephone having signal processing circuitry including synchronization circuitry responsive to the synchronization portion of an individual one of said messages to permit a reading of data of the data portion of an individual one of said messages, said signal processing circuitry including a digital phase locked loop (DPLL) with phase adjustment capability, said radiotelephone including power application circuitry for application and disconnection of electric power to said receiver, wherein power is applied continuously to the DPLL, the method comprising steps of:

synchronizing the DPLL with bits of a portion of an $N^{th}$ message of said sequence of messages, the DPLL providing a clock signal to enable a reading of data;

reading data of the data portion of said $N^{th}$ message;

subsequent to said reading step, inhibiting phase adjustment of the DPLL;

operating the power application circuitry for deactivating the receiver;

operating the power application circuitry for activating the receiver at a predetermined time interval prior to occurrence of a selected part of the data portion of a message subsequent to a first message, said predetermined time interval being limited in duration to the duration of a transient settling time of the receiver upon the activation of the receiver; and enabling the phase adjustment capability of the DPLL in an interval of time beginning at or prior to the selected part of the data portion of the subsequent message and continuing during the occurrence of the selected part of the data portion of the subsequent message.

2. A method according to claim 1 wherein the signal processing circuitry includes a clock for driving various components of the signal processing circuitry, the clock comprising a first relatively fast oscillator outputting a signal at a first frequency and being powered by said power application circuitry, a relatively slow oscillator outputting a signal at a second frequency lower than said first frequency and being powered by a steady source of power, frequency generation circuitry driven by the slow oscillator for outputting at least a further signal at a third frequency lower than said second frequency, the frequency generation circuitry including a selector for selecting the fast oscillator signal in place of the slow oscillator signal, said method further comprising steps of:

operating said power application circuitry to deactivate said fast frequency oscillator of said clock substantially concurrently with said deactivating of the receiver; and operating said power application circuitry for activating fast oscillator of said clock prior to said step of enabling the phase adjustment capability of the DPLL.

3. A method according to claim 1 wherein said reading step includes a reading of a data word at an end of the data portion of an $(N-1)^{th}$ message of said sequence of messages and a reading of a data word at a beginning of the data portion of the Nth message of said sequence of messages followed by a reading of a data word at an end of the data portion of $(N+1)^{th}$ message of said sequence of messages and a reading of a data word at a beginning of the data portion of the $(N+2)^{th}$ message of said sequence of messages.

4. A method according to claim 3 wherein there is a period of time between the reading of the data word of the $N^{th}$ message and the reading of the data word of the $(N+1)^{th}$ message, said inhibiting step being performed in a beginning portion of said period and said enabling step being performed in an end portion of said period.

5. A system for operating a radiotelephone at reduced power, the radiotelephone comprising:

a receiver for receiving a sequence of messages of a control channel, each message having a synchronization portion and a data portion which follows the synchronization portion;

signal processing circuitry including synchronization circuitry responsive to the synchronization portion of an individual one of said messages to enable a reading of data of the data portion of an individual one of said messages, said signal processing circuitry including a digital phase locked loop (DPLL) with phase adjustment capability, said signal processing circuitry applying electric power to said DPLL continuously from a steady source of power, said DPLL being synchronized by bits of a portion of an $N^{th}$ message of said sequence of messages;

power application circuitry for application of electric power to said receiver;

reading means for accomplishing said reading of data, said reading means reading data of at least a selected part of the data portion of said $N^{th}$ message;

inhibiting means for inhibiting phase adjustment of the DPLL, and controller means for activating said inhibiting means subsequent to a reading of data by said reading means;

wherein said power application circuitry is operative for deactivating the receiver upon a conclusion of a reading of data of said selected part of the data portion of said $N^{th}$ message;

said power application circuitry is operative for activating the receiver subsequent to said $N^{th}$ message at a predetermined time interval prior to occurrence of at least a selected part of the data portion of an $(N+1)^{th}$ message of said sequence of messages, said predetermined time interval being limited in duration to the duration of a transient settling time of the receiver upon an activation of the receiver; and said controller means disables said inhibiting means for enabling the phase adjustment capability of the DPLL in an interval of time beginning at or prior to and continuing during the occurrence of the selected part of the data portion of the $(N+1)^{th}$ message.

6. A system according to claim 5 wherein the signal processing circuitry includes a clock for driving various components of the signal processing circuitry, the clock comprising a first relatively fast oscillator outputting a signal at a first frequency and being powered by said power application circuitry, a relatively slow oscillator outputting a signal at a second frequency lower than said first frequency and being powered by a steady source of power, frequency generation circuitry driven by the slow oscillator for outputting at least a further signal at a third frequency lower than said second frequency, the frequency generation circuitry including a selector for selecting the fast oscillator signal in place of the slow oscillator signal;

wherein said power application circuitry is operative to deactivate said fast oscillator of said clock substantially concurrently with said deactivating of the receiver; and said power application circuitry is operative for activating said fast oscillator of said clock prior to an enabling of the phase adjustment capability of said DPLL.

7. A system according to claim 5 wherein said reading means is responsive to said controller means to accomplish a reading of a data word at an end of the data portion of an $(N-1)^{th}$ message of said sequence of messages and a reading of a data word at a beginning of the data portion of the Nth message of said sequence of messages followed by a reading of a data word at an end of the data portion of $(N+1)^{th}$ message of said sequence of messages and a reading of a data word at a beginning of the data portion of the $(N+2)^{th}$ message of said sequence of messages.

8. A system according to claim 7 wherein there is a period of time between the reading of the data word of the $N^{th}$ message and the reading of the data word of the $(N+1)^{th}$ message, said controller means operating said inhibiting means to inhibit the phase adjustment in a beginning portion of said period and to enable the phase adjustment in an end portion of said period.

9. A system according to claim 5 wherein said DPLL includes phase adjustment means and a phase detector, said inhibiting means comprising an electronic gate interconnecting said phase detector with an input terminal of said phase adjustment means, and wherein said electronic gate is responsive to a command of said controller means for terminating a communication of signals from said phase detector to said phase adjustment means.

10. A system according to claim 5 further comprising timing means responsive to an output reference signal of said DPLL for operating said reading means; wherein said reference signal of said DPLL is maintained during periods of deenergization of said receiver for operation of said timing means, said inhibiting of said DPLL accomplishing a freezing of output phase of said reference signal during the periods of deenergization of said receiver.

11. A system according to claim 10 wherein said timing means is operative to count clock pulses of the reference signal outputted by said DPLL during periods of inhibition of phase adjustment by said DPLL and during periods of phase adjustment by said DPLL.

12. A system according to claim 11 wherein said DPLL comprises phase adjustment means operative in response to an enabling signal, and said phase adjustment is inhibited by termination of said enabling signal.

13. A system according to claim 11 wherein said DPLL comprises a counter operative to count clock signal pulses outputted by said clock in response to a presence of data at an input terminal of said counter, and said phase adjustment is inhibited by termination of the presence of said data.

14. A system according to claim 11 wherein said DPLL comprises a counter operative to count clock signal pulses outputted by said clock in response to an enabling signal, and said phase adjustment is inhibited by termination of said enabling signal.

15. A system according to claim 11 wherein said reading means is responsive to said controller means to accomplish a reading of a data word at an end of the data portion of an $(N-1)^{th}$ message of said sequence of messages and a reading of a data word at a beginning of the data portion of the Nth message of said sequence of messages followed by a reading of a data word at an end of the data portion of $(N+1)^{th}$ message of said sequence of messages and a reading of a data word at a beginning of the data portion of the $(N+2)^{th}$ message of said sequence of messages; and there is a period of time between the reading of the data word of the $N^{th}$ message and the reading of the data word of the $(N+1)^{th}$ message, said controller means operating said inhibiting means to inhibit the phase adjustment in a beginning portion of said period and to enable the phase adjustment in an end portion of said period.

16. A system according to claim 5 wherein the signal processing circuitry includes a clock for driving various components of the signal processing circuitry, the clock comprising a first relatively fast oscillator outputting a signal at a first frequency and being powered by said power application circuitry, a relatively slow oscillator outputting a signal at a second frequency lower than said first frequency and being powered by a steady source of power, frequency generation circuitry driven by the slow oscillator for outputting at least a further signal at a third frequency lower than said second frequency, the frequency generation circuitry including a selector for selecting the fast oscillator signal in place of the slow oscillator signal; and said fast oscillator is energized by said power application circuitry, and is selected by said selector for driving said frequency generation circuitry concurrently with operation of said DPLL for adjustment of phase of the reference signal outputted by said DPLL to a timing means.

17. A system according to claim 16 wherein said fast oscillator is deenergized by said power application circuitry, and said slow oscillator is selected by said selector for driving said frequency generation circuitry concurrently with inhibition of the phase adjustment of said DPLL, thereby maintaining accurate timing of said timing means during the periods of deenergization of said receiver and without sync detection for each frame of data.

18. A method for operating a radiotelephone at reduced power, the radiotelephone having a receiver for receiving a sequence of messages of a control channel, each message having a synchronization portion and a data portion which follows the synchronization portion, the data portion comprising a plurality of data channels each of which has a succession of repeated data segments, the radiotelephone having signal processing circuitry including synchronization circuitry responsive to the synchronization portion of an individual one of said messages to permit a reading of data of the data portion of an individual one of said messages, said signal processing circuitry including a digital phase locked loop (DPLL) with phase adjustment capability, said radiotelephone including power application circuitry for application and disconnection of electric power to said receiver, wherein power is applied continuously to the DPLL, the method comprising steps of:

synchronizing the DPLL with a bit stream of a selected data segment of said data segments of an $N^{th}$ message of said sequence of messages, the DPLL providing a clock signal to enable a reading of data;

reading data of the data segment of said $N^{th}$ message;

subsequent to said reading step, inhibiting phase adjustment of the DPLL;

operating the power application circuitry for deactivating the receiver;

operating the power application circuitry for activating the receiver at a predetermined time interval prior to occurrence of the selected data segment of the $(N+1)^{th}$ message of said sequence of messages, said predetermined time interval being limited in duration to the duration of a transient settling time of the receiver upon the activation of the receiver; and enabling the phase adjustment capability of the DPLL in an interval of time beginning at or prior to the selected data segment of the $(N+1)^{th}$ message of said sequence of messages and continuing during the occurrence of the selected data segment of said $(N+1)^{th}$ message.

19. A method according to claim 18 wherein the signal processing circuitry includes a clock for driving various components of the signal processing circuitry, the clock comprising a first relatively fast oscillator outputting a signal at a first frequency and being powered by said power application circuitry, a relatively slow oscillator outputting a signal at a second frequency lower than said first frequency and being powered by a steady source of power, frequency generation circuitry driven by the slow oscillator for outputting at least a further signal at a third frequency lower than said second frequency, the frequency generation circuitry including a selector for selecting the fast oscillator signal in place of the slow oscillator signal, said method further comprising steps of:

operating said power application circuitry to deactivate said fast frequency oscillator of said clock substantially concurrently with said deactivating of the receiver; and operating said power application circuitry for activating fast oscillator of said clock prior to said step of enabling the phase adjustment capability of the DPLL.

20. A system for operating a radiotelephone at reduced power, the radiotelephone comprising:

a receiver for receiving a sequence of messages of a control channel, each message having a synchronization portion and a data portion which follows the synchronization portion, the data portion comprising a plurality of data channels each of which has a succession of repeated data segments;

signal processing circuitry including synchronization circuitry responsive to the synchronization portion of an individual one of said messages to enable a reading of data of the data portion of an individual one of said messages, said signal processing circuitry including a digital phase locked loop (DPLL) with phase adjustment capability, said signal processing circuitry applying electric power to said DPLL continuously from a steady source of power, said DPLL being synchronized by a bit stream of a selected data segment of said data segments of an $N^{th}$ message of said sequence of messages;

power application circuitry for application of electric power to said receiver;

reading means for accomplishing said reading of data, said reading means reading data of the selected data segment of said $N^{th}$ message;

inhibiting means for inhibiting phase adjustment of the DPLL, and controller means for activating said inhibiting means subsequent to a reading of data by said reading means;

wherein said power application circuitry is operative for deactivating the receiver upon a conclusion of a reading of data of said selected data segment of said $N^{th}$ message;

said power application circuitry is operative for activating the receiver subsequent to said $N^{th}$ message at a predetermined time interval prior to occurrence of the selected data segment of an $(N+1)^{th}$ message of said sequence of messages, said predetermined time interval being limited in duration to the duration of a transient settling time of the receiver upon an activation of the receiver; and said controller means disables said inhibiting means for enabling the phase adjustment capability of the DPLL in an interval of time beginning at or prior to and continuing during the occurrence of the selected data segment of the $(N+1)^{th}$ message.

21. A system according to claim 20 wherein the signal processing circuitry includes a clock for driving various components of the signal processing circuitry, the clock comprising a first relatively fast oscillator outputting a signal at a first frequency and being powered by said power application circuitry, a relatively slow oscillator outputting a signal at a second frequency lower than said first frequency and being powered by a steady source of power, frequency generation circuitry driven by the slow oscillator for outputting at least a further signal at a third frequency lower than said second frequency, the frequency generation circuitry including a selector for selecting the fast oscillator signal in place of the slow oscillator signal;

wherein said power application circuitry is operative to deactivate said fast oscillator of said clock substantially concurrently with said deactivating of the receiver; and said power application circuitry is operative for activating said fast oscillator of said clock prior to an enabling of the phase adjustment capability of said DPLL.

\* \* \* \* \*